(12) United States Patent
Sato et al.

(10) Patent No.: US 11,349,146 B2
(45) Date of Patent: May 31, 2022

(54) ALL-SOLID LITHIUM ION SECONDARY BATTERY

(71) Applicant: TDK CORPORATION, Tokyo (JP)

(72) Inventors: Hiroshi Sato, Tokyo (JP); Masahiro Oishi, Tokyo (JP); Takeo Tsukada, Tokyo (JP); Gakuho Isomichi, Tokyo (JP); Tetsuya Ueno, Tokyo (JP)

(73) Assignee: TDK CORPORATION, Tokyo (JP)

( * ) Notice: Subject to any disclaimer, the term of this patent is extended or adjusted under 35 U.S.C. 154(b) by 167 days.

(21) Appl. No.: 16/335,335

(22) PCT Filed: Sep. 25, 2017

(86) PCT No.: PCT/JP2017/034480
§ 371 (c)(1),
(2) Date: Mar. 21, 2019

(87) PCT Pub. No.: WO2018/062080
PCT Pub. Date: Apr. 5, 2018

(65) Prior Publication Data
US 2019/0280327 A1 Sep. 12, 2019

(30) Foreign Application Priority Data
Sep. 29, 2016 (JP) .............................. JP2016-192079

(51) Int. Cl.
*H01M 10/0525* (2010.01)
*H01M 10/0562* (2010.01)
(Continued)

(52) U.S. Cl.
CPC ......... *H01M 10/0525* (2013.01); *H01M 4/13* (2013.01); *H01M 4/136* (2013.01);
(Continued)

(58) Field of Classification Search
CPC ........................ H01M 2300/006; H01M 50/04
See application file for complete search history.

(56) References Cited

U.S. PATENT DOCUMENTS

| 2007/0202400 A1 | 8/2007 | Yoshida et al. |
| 2010/0216032 A1 | 8/2010 | Baba et al. |
| 2014/0356736 A1* | 12/2014 | Choi .................. H01M 4/60 429/405 |

FOREIGN PATENT DOCUMENTS

| JP | 2004-281316 A | 10/2004 |
| JP | 2007-258165 A | 10/2007 |

(Continued)

OTHER PUBLICATIONS

JP-2010056093-A—machine translation (Year: 2010).*
(Continued)

*Primary Examiner* — Haroon S. Sheikh
(74) *Attorney, Agent, or Firm* — Oliff PLC

(57) ABSTRACT

An all-solid lithium ion secondary battery has a pair of electrode layers and a solid electrolyte layer between the pair of electrode layers. In the all-solid lithium ion secondary battery, at least one electrode of the pair of electrodes has an active material layer and an intermediate layer on the surface of the active material layer on the side of the solid electrolyte layer, and each of the solid electrolyte layer, the intermediate layer, and the active material layer includes a compound containing Li and two or more shared types of metal elements other than Li, the two or more shared types of metal elements in the solid electrolyte layer, the intermediate layer, and the active material layer are identical between the solid electrolyte layer, the intermediate layer, and the active material layer.

24 Claims, 1 Drawing Sheet

(51) Int. Cl.
*H01M 10/0585* (2010.01)
*H01M 4/58* (2010.01)
*H01M 10/052* (2010.01)
*H01M 4/13* (2010.01)
*H01M 4/136* (2010.01)

(52) U.S. Cl.
CPC ........... *H01M 4/58* (2013.01); *H01M 4/5825* (2013.01); *H01M 10/052* (2013.01); *H01M 10/0562* (2013.01); *H01M 10/0585* (2013.01); *H01M 2300/0068* (2013.01)

(56) References Cited

FOREIGN PATENT DOCUMENTS

| | | | |
|---|---|---|---|
| JP | 2010-056093 A | | 3/2010 |
| JP | 2010056093 A | * | 3/2010 |
| WO | 2008/143027 A1 | | 11/2008 |

OTHER PUBLICATIONS

Dec. 5, 2017 International Search Report issued in International Patent Application No. PCT/JP2017/034480.
Nov. 2, 2021 Office Action issued in Japanese Patent Application No. 2018-542541.

* cited by examiner

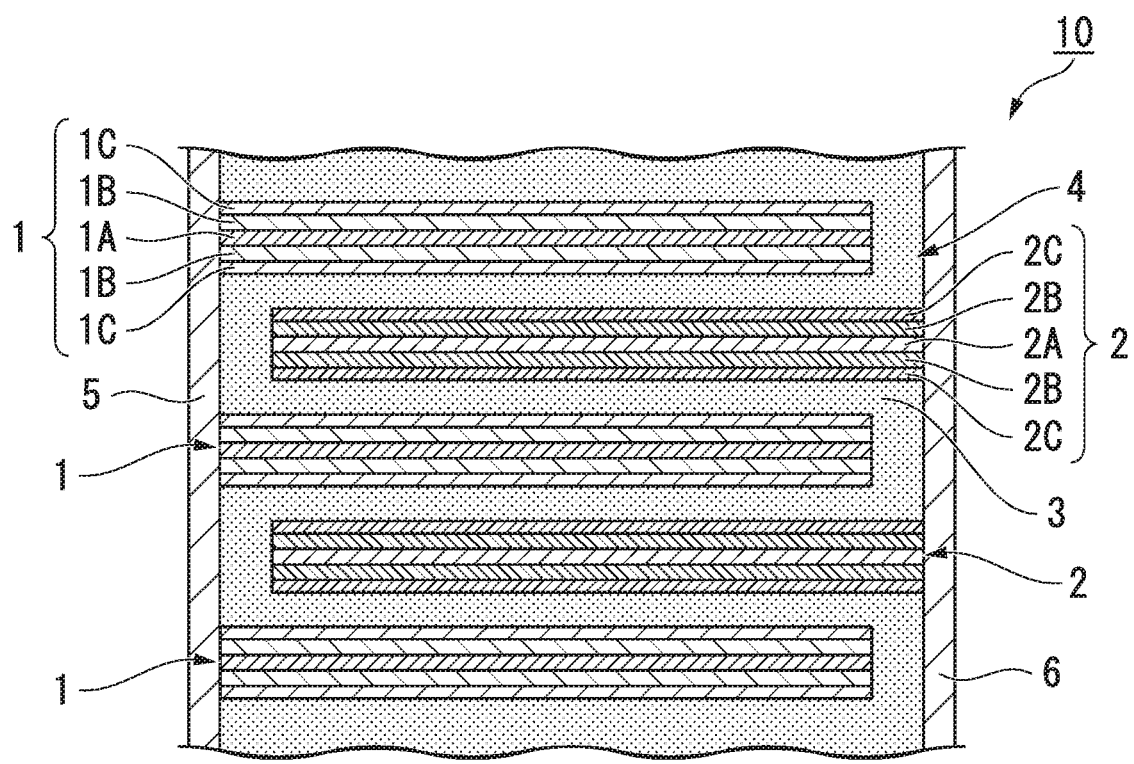

ALL-SOLID LITHIUM ION SECONDARY BATTERY

TECHNICAL FIELD

The present invention relates to an all-solid lithium ion secondary battery.

Priority is claimed on Japanese Patent Application No. 2016-192079, filed Sep. 29, 2016, the content of which is incorporated herein by reference.

BACKGROUND ART

Lithium ion secondary batteries are widely used as power supplies for small mobile devices, for example, mobile phones, notebook PCs, and PDAs. For lithium ion secondary batteries used in such small mobile devices, reducing the size and thickness and improving the reliability are required.

As lithium ion secondary batteries, a lithium ion secondary battery in which an organic electrolytic solution is used as an electrolyte and a lithium ion secondary battery in which a solid electrolyte is used as an electrolyte are known. Compared to a lithium ion secondary battery using an organic electrolytic solution, a lithium ion secondary battery (all-solid lithium ion secondary battery) in which a solid electrolyte is used as an electrolyte has a high degree of freedom in designing a cell shape, and is easily reduced in cell size and thickness, and has advantages that leakage of the electrolytic solution does not occur and the reliability is high.

On the other hand, generally, since an all-solid lithium ion secondary battery has lower lithium ion conductivity than that when using an organic electrolytic solution, the all-solid lithium ion secondary battery has problems that the internal resistance is higher and the output current is lower than a lithium ion secondary battery using an organic electrolytic solution. Therefore, in the all-solid lithium ion secondary battery, it is necessary to increase the ionic conductivity of lithium ions and reduce the internal resistance.

Patent Literature 1 describes that a polyanion compound is used for a positive electrode active material, a negative electrode active material, and a solid electrolyte of an all-solid lithium ion secondary battery, and an element group (X) forming a polyanion constituting the positive electrode active material, the negative electrode active material, and the solid electrolyte is shared. According to Patent Literature 1, when the element group (X) forming a polyanion is shared, mutual ionic conductivity of the positive electrode, the negative electrode, and the solid electrolyte layer is improved and extraction of a high current and charging and discharging cycle characteristics are improved.

On the other hand, Patent Literature 2 describes an all-solid lithium ion secondary battery in which an intermediate layer made of a substance functioning as an active material or an electrolyte is formed at an interface between a positive electrode layer and/or a negative electrode layer and an electrolyte layer. Patent Literature 2 describes that the intermediate layer is formed when a positive electrode active material and/or a negative electrode active material, and a solid electrolyte react and/or diffuse, and for example, $LiMn_2O_4$ is used as the positive electrode active material, $Li_{3.5}Si_{0.5}P_{0.5}O_4$ is used as the solid electrolyte, and an intermediate layer including $LiMnO_2$, $Li_2MnO_3$, and $Li_{1.4}Mn_{1.7}O_4$ is formed.

CITATION LIST

Patent Literature

[Patent Literature 1]
   Japanese Unexamined Patent Application, First Publication No. 2007-258165
[Patent Literature 2]
   PCT International Publication No. WO 2008/143027

SUMMARY OF INVENTION

Technical Problem

In an all-solid lithium ion secondary battery, it is required to reduce the internal resistance. However, in the all-solid lithium ion secondary batteries described in Patent Literature 1 and 2, it is difficult to further reduce the internal resistance.

In the all-solid lithium ion secondary battery described in Patent Literature 1, a polyanion compound is used for the positive electrode active material, the negative electrode active material, and the solid electrolyte. However, metal components included in the polyanion compound are different between the positive electrode active material and the negative electrode active material, and the solid electrolyte. Therefore, it is difficult to improve lithium ion conductivity between the positive electrode active material and the solid electrolyte, and between the negative electrode active material and the solid electrolyte, and it is difficult to reduce the internal resistance.

In addition, in the all-solid lithium ion secondary battery described in Patent Literature 2, since compositions of the intermediate layer and the solid electrolyte layer are different, it is difficult to improve lithium ion conductivity between the intermediate layer and the solid electrolyte layer, and it is difficult to reduce the internal resistance.

The present invention has been made in view of the above problems, and an object of the present invention is to provide a solid lithium ion secondary battery with a reduced internal resistance.

Solution to Problem

The inventors found that, when an intermediate layer is provided between an active material layer of an electrode layer and a solid electrolyte layer, and each of the solid electrolyte layer, the intermediate layer, and the active material layer is formed by using a compound containing two or more types of metal elements other than Li, the two or more types of metal elements in the solid electrolyte layer, the intermediate layer, and the active material layer being identical between the solid electrolyte layer, the intermediate layer, and the active material layer, an all-solid lithium ion secondary battery with a reduced internal resistance can thereby be obtained. The reason why the internal resistance of the all-solid lithium ion secondary battery is reduced is thought to be that the compounds forming each of the solid electrolyte layer, the intermediate layer, and the active material layer contains the two or more shared types of metal elements other than Li, and thus lithium ion conductivity between the active material layer and the solid electrolyte layer is improved.

That is, the present invention provides the following aspects in order to solve the above problems.

An all-solid lithium ion secondary battery having a pair of electrode layers and a solid electrolyte layer provided between the pair of electrode layers, wherein at least one electrode of the pair of electrodes has an active material layer and an intermediate layer provided on the surface of the active material layer on the side of the solid electrolyte layer, and wherein each of the solid electrolyte layer, the intermediate layer, and the active material layer contains a Li-containing compound which contains Li and two or more shared types of metal elements other than Li, the two or more shared types of metal elements in the solid electrolyte layer, the intermediate layer, and the active material layer being identical between the solid electrolyte layer, the intermediate layer, and the active material layer.

In the all-solid lithium ion secondary battery according to the above aspect, the Li-containing compound in the solid electrolyte layer, the Li-containing compound in the intermediate layer, and the Li-containing compound in the active material layer may include a shared type of polyanion, the shared type of polyanion in the solid electrolyte layer, the intermediate layer, and the active material layer being identical between the solid electrolyte layer, the intermediate layer, and the active material layer.

In the all-solid lithium ion secondary battery according to the above aspect, the shared type of polyanion may be a polyphosphate.

In the all-solid lithium ion secondary battery according to the above aspect, the two or more shared types of metal elements contained in the Li-containing compound in the solid electrolyte layer, the Li-containing compound in the intermediate layer, and the Li-containing compound in the active material layer may be V, Ti, and Al.

In the all-solid lithium ion secondary battery according to the above aspect, a content of V may decrease in the order of the Li-containing compound in the solid electrolyte layer, the Li-containing compound in the intermediate layer, and the Li-containing compound in the active material layer.

In the all-solid lithium ion secondary battery according to the above aspect, contents of Ti and Al may increase in the order of the Li-containing compound in the solid electrolyte layer, the Li-containing compound in the intermediate layer, and the Li-containing compound in the active material layer.

In the all-solid lithium ion secondary battery according to the above aspect, the thickness of the intermediate layer may be in a range of 0.5 µm or more and 5.0 µm or less.

In the all-solid lithium ion secondary battery according to the above aspect, electrode layers on both sides of the pair of electrode layers may include an active material layer and an active material layer including an intermediate layer provided on the surface of the active material layer on the side of the solid electrolyte layer.

In the all-solid lithium ion secondary battery according to the above aspect, a pair of electrode layers and a solid electrolyte layer provided between the pair of electrode layers may have a relative density of 80% or more.

Advantageous Effects of Invention

According to the all-solid lithium ion secondary battery of the aspect of the present invention, the internal resistance is reduced.

BRIEF DESCRIPTION OF DRAWINGS

FIG. 1 is a cross-sectional schematic view showing an enlarged main part of an all-solid lithium ion secondary battery according to an embodiment of the present invention.

DESCRIPTION OF EMBODIMENTS

The present embodiment will be appropriately described below in detail with reference to the drawings. In the drawings used in the following description, in order to facilitate understanding of features of the present embodiment, characteristic parts are enlarged for convenience of illustration in some cases, and the dimensional proportions of components may be different from actual components. Materials, sizes, and the like exemplified in the following description are examples not limiting the present embodiment, and can be appropriately changed and implemented within a range not changing the scope and spirit thereof.

FIG. 1 is a cross-sectional schematic view showing an enlarged main part of an all-solid lithium ion secondary battery according to the present embodiment. As shown in FIG. 1, an all-solid lithium ion secondary battery 10 includes a laminate 4 including a first electrode layer 1, a second electrode layer 2, and a solid electrolyte layer 3. The first electrode layer 1 and the second electrode layer 2 form a pair of electrodes.

The first electrode layer 1 is connected to a first external terminal 5, and the second electrode layer 2 is connected to a second external terminal 6. The first external terminal 5 and the second external terminal 6 are electrical contacts for the outside.

(Laminate)

The laminate 4 has the first electrode layer 1, the second electrode layer 2, and the solid electrolyte layer 3. One of the first electrode layer 1 and the second electrode layer 2 functions as a positive electrode, and the other thereof functions as a negative electrode. The positivity or negativity of the electrode layer varies depending on which pole is connected to an external terminal. Hereinafter, in order to facilitate understanding, the first electrode layer 1 is set as a positive electrode layer 1, and the second electrode layer 2 is set as a negative electrode layer 2.

In the laminate 4, the positive electrode layer 1 and the negative electrode layer 2 are alternately laminated with the solid electrolyte layer 3 therebetween. Lithium ions are exchanged between the positive electrode layer 1 and the negative electrode layer 2 with the solid electrolyte layer 3 therebetween and the all-solid lithium ion secondary battery 10 is charged and discharged.

The positive electrode layer 1 includes a positive electrode current collector layer 1A, a positive electrode active material layer 1B containing a positive electrode active material, and a positive electrode intermediate layer 1C provided on the surface of the positive electrode active material layer 1B on the side of the solid electrolyte layer 3. The negative electrode layer 2 includes a negative electrode current collector layer 2A, a negative electrode active material layer 2B containing a negative electrode active material, and a negative electrode intermediate layer 2C provided on the surface of the negative electrode active material layer 2B on the side of the solid electrolyte layer 3.

(Current Collector Layer)

It is preferable that the positive electrode current collector layer 1A and the negative electrode current collector layer 2A have high conductivity. Therefore, it is preferable that the positive electrode current collector layer 1A and the negative electrode current collector layer 2A contain a low resistance metal, for example, silver, palladium, gold, platinum, aluminum, copper, or nickel. Among such low resistance metals, copper is unlikely to react with a positive electrode active material, a negative electrode active material, or a solid electrolyte. Therefore, when the positive electrode current collector layer 1A and the negative electrode current collector layer 2A which contain copper are used, it is possible to reduce the internal resistance of the all-solid lithium ion secondary battery 10 over a long period. The compositions of the positive electrode current collector layer 1A and the negative electrode current collector layer 2A may be the same as or different from each other.

The positive electrode current collector layer 1A and the negative electrode current collector layer 2A may contain a positive electrode active material and a negative electrode active material to be described below. The contents of active materials contained in respective current collector layers are not particularly limited as long as they function as a current collector. For example, a low resistance metal/a positive electrode active material, or a low resistance metal/a negative electrode active material preferably has a range of 90/10 to 70/30 by volume ratio. When the positive electrode current collector layer 1A and the negative electrode current collector layer 2A contain a positive electrode active material and a negative electrode active material, the adhesion between the positive electrode current collector layer 1A and the positive electrode active material layer 1B and between the negative electrode current collector layer 2A and the negative electrode active material layer 2B is improved.

(Active Material Layer)

The positive electrode active material layer 1B is formed on one surface or both surfaces of the positive electrode current collector layer 1A. For example, the positive electrode layer 1 positioned as the uppermost layer in the all-solid lithium ion secondary battery 10 in the lamination direction has no facing negative electrode layer 2. Thus, in the positive electrode layer 1 positioned as the uppermost layer of the all-solid lithium ion secondary battery 10, the positive electrode active material layer 1B may be provided only on one surface on the lower side in the lamination direction. Like the positive electrode active material layer 1B, the negative electrode active material layer 2B is formed on one surface or both surfaces of the negative electrode current collector layer 2A. The thicknesses of the positive electrode active material layer 1B and the negative electrode active material layer 2B are preferably in a range of 0.5 μm or more and 5.0 μm or less. When the thicknesses of the positive electrode active material layer 1B and the negative electrode active material layer 2B are set to 0.5 μm or more, it is possible to increase the battery capacity of the all-solid lithium ion secondary battery. On the other hand, when the thickness is set to 5.0 μm or less, since a lithium ion diffusion distance is shortened, it is possible to further reduce the internal resistance of the all-solid lithium ion secondary battery.

The positive electrode active material layer 1B and the negative electrode active material layer 2B contain a positive electrode active material and a negative electrode active material which exchange electrons with lithium ions. In addition, a conductive additive and the like may be included. A positive electrode active material and a negative electrode active material that can efficiently insert and release lithium ions are preferable. Materials of the positive electrode active material layer 1B and the negative electrode active material layer 2B will be described below.

(Intermediate Layer)

The positive electrode intermediate layer 1C has a function of further increasing the adhesion between the solid electrolyte layer 3 and the positive electrode active material layer 1B and improving lithium ion conductivity between the solid electrolyte layer 3 and the positive electrode active material layer 1B. The negative electrode intermediate layer 2C has a function of further increasing the adhesion between the solid electrolyte layer 3 and the negative electrode active material layer 2B and improving lithium ion conductivity between the solid electrolyte layer 3 and the negative electrode active material layer 2B. When the positive electrode intermediate layer 1C and the negative electrode intermediate layer 2C are provided, it is possible to further reduce the internal resistance of the all-solid lithium ion secondary battery. The thicknesses of the positive electrode intermediate layer 1C and the negative electrode intermediate layer 2C are preferably in a range of 0.5 μm or more and 5.0 μm or less. When the thicknesses of the positive electrode intermediate layer 1C and the negative electrode intermediate layer 2C are set to 0.5 μm or more, it is possible to reliably improve lithium ion conductivity between the solid electrolyte layer 3 and the positive electrode active material layer 1B or the negative electrode intermediate layer 2C. On the other hand, when the thickness is set to 5.0 μm or less, since a lithium ion moving distance is shortened, it is possible to further reduce the internal resistance of the all-solid lithium ion secondary battery.

(Solid Electrolyte Layer)

The solid electrolyte layer 3 is provided between the positive electrode layer 1 and the negative electrode layer 2. The thickness of the solid electrolyte layer 3 is preferably in a range of 0.5 μm or more and 20.0 μm or less. When the thickness of the solid electrolyte layer 3 is set to 0.5 μm or more, it is possible to reliably prevent short circuiting of the positive electrode layer 1 and the negative electrode layer 2. When the thickness is set to 20.0 μm or less, since a lithium ion moving distance is shortened, it is possible to further reduce the internal resistance of the all-solid lithium ion secondary battery.

The solid electrolyte layer 3 contains a solid electrolyte which is a lithium ion conductor. It is preferable that the solid electrolyte constituting the solid electrolyte layer 3 have high lithium ion conductivity and low electron conductivity. The material of the solid electrolyte layer 3 will be described below.

(Material of Active Material Layer, Intermediate Layer, and Solid Electrolyte Layer)

In the all-solid lithium ion secondary battery of the present embodiment, each of the solid electrolyte layer 3, the intermediate layer (the positive electrode intermediate layer 1C, the negative electrode intermediate layer 2C), and the active material layer (the positive electrode active material layer 1B, and the negative electrode active material layer 2B) contains a Li-containing compound, which contains Li and two or more shared types of metal elements other than Li (the Li-containing compound). When the Li-containing compounds contained in each layer contain the shared two or more types of metal element, since the interlayer and the inside of each layer are firmly bonded, the lithium ion conductivity is improved and the internal resistance of the all-solid lithium ion secondary battery is reduced.

It is preferable that a Li-containing compound (solid electrolyte) contained in the solid electrolyte layer 3, an intermediate-layer-forming Li-containing compound in the intermediate layers 1C and 2C, and a Li-containing compound (electrode active material) contained in the active material layers 1B and 2B include a shared type of polyanion. The polyanion is preferably an anion composed of an $XO_4$ tetrahedron (X=P, S, As, Mo, W, Si), and is preferably a polyphosphate.

The shared metal elements contained in the solid electrolyte, the intermediate-layer-forming Li-containing compound, and the electrode active material may be V, Ti, and Al.

Preferably, a content of V is reduced in the order of the solid electrolyte, the intermediate-layer-forming Li-containing compound, and the electrode active material. V has a function of imparting electron conductivity to a Li-containing compound. Therefore, in this case, the electron conductivity is improved in the order of the solid electrolyte, the intermediate-layer-forming Li-containing compound, and the electrode active material. When the electron conductivity of the solid electrolyte is kept low, internal short circuiting is unlikely to occur in the all-solid lithium ion secondary battery. In addition, when the electron conductivity of the intermediate-layer-forming Li-containing compound and the electrode active material is higher, the internal resistance of the all-solid lithium ion secondary battery is reduced.

On the other hand, preferably, contents of Ti and Al are increased in the order of the solid electrolyte, the intermediate-layer-forming Li-containing compound, and the electrode active material. Ti and Al have a function of imparting electronic insulating properties to a Li-containing compound. Accordingly, in this case, the electronic insulating properties are improved in the order of the solid electrolyte, the intermediate-layer-forming Li-containing compound, and the electrode active material.

Preferably, the intermediate-layer-forming Li-containing compound has an intermediate composition with respect to the solid electrolyte and the electrode active material. Therefore, a difference in composition between the intermediate layers 1C and 2C, and the solid electrolyte layer 3 and the active material layers 1B and 2B is further reduced. Accordingly, the adhesion between the solid electrolyte layer 3 and the active material layers 1B and 2B is further improved and the lithium ion conductivity is further improved.

Here, the "composition is intermediate" means that a proportion of the shared metal elements other than Li in the intermediate-layer-forming Li-containing compound, that is, V, Al, or Ti, is intermediate between a proportion of V, Al, or Ti in the electrode active material, and a proportion of V, Al, or Ti in the solid electrolyte. A proportion of V, Al, or Ti in the intermediate-layer-forming Li-containing compound need not be an average value of a proportion of V, Al, or Ti in the electrode active material and a proportion of V, Al, or Ti in the solid electrolyte.

For example, when the electrode active material is a compound represented by the following General Formula (1) and the solid electrolyte is a compound represented by the following General Formula (2), the intermediate-layer-forming Li-containing compound is preferably a compound represented by the following General Formula (3).

$$Li_aV_bAl_cTi_dP_eO_{12} \quad (1)$$

Here, in General Formula (1), a, b, c, d and e are numbers satisfying $0.5 \leq a \leq 3.0$, $1.20 < b \leq 2.00$, $0.01 \leq c < 0.06$, $0.01 \leq d < 0.60$, and $2.80 \leq e \leq 3.20$. Particularly preferably, a, b, c, d and e are numbers satisfying $0.8 \leq a \leq 3.0$, $1.20 < b \leq 2.00$, $0.01 \leq c < 0.06$, $0.01 \leq d < 0.60$, and $2.90 \leq e \leq 3.10$.

$$Li_fV_gAl_hTi_iP_jO_{12} \quad (2)$$

Here, in General Formula (2), f, g, h, i and j are numbers satisfying $0.5 \leq f \leq 3.0$, $0.01 \leq g < 1.00$, $0.09 < h \leq 0.30$, $1.40 < i \leq 2.00$, and $2.80 \leq j \leq 3.20$. Particularly preferably, f, g, h, i and j are numbers satisfying $0.8 \leq f \leq 3.0$, $0.01 \leq g < 1.00$, $0.09 < h \leq 0.30$, $1.40 < i \leq 2.00$, and $2.90 \leq j \leq 3.10$.

$$Li_kV_mAl_nTi_qP_rO_{12} \quad (3)$$

Here, in General Formula (3), k, m, n, q and r are numbers satisfying $0.5 \leq k \leq 3.0$, $1.00 \leq m \leq 1.20$, $0.06 \leq n \leq 0.09$, $0.60 \leq q \leq 1.40$, and $2.80 \leq r \leq 3.20$. Particularly preferably, k, m, n, q and r are numbers satisfying $0.8 \leq k \leq 3.0$, $1.00 \leq m \leq 1.20$, $0.06 \leq n \leq 0.09$, $0.60 \leq q \leq 1.40$, and $2.90 \leq r \leq 3.10$.

When the electrode active material, the solid electrolyte, and the intermediate-layer-forming Li-containing compound satisfy the above Formulae (1) to (3), since the interlayer and the inside of each layer are further firmly bonded, the lithium ion conductivity is improved and the internal resistance of the all-solid lithium ion secondary battery is reduced.

The intermediate-layer-forming Li-containing compound preferably has the same crystal structure as at least one of the solid electrolyte and the electrode active material. Having the same crystal structure means that it has the same space group. When the crystal structure is the same, distortion is unlikely to occur at an interface and the adhesion between the solid electrolyte and the active material layer can be further improved.

The fact that the intermediate layers 1C and 2C are provided between the active material layers 1B and 2B and the solid electrolyte layer 3 can be confirmed by measuring proportions of the shared metal elements other than Li, that is, V, Al, or Ti, using SEM-EDS, STEM-EDS, EPMA, or the like. For example, point analysis, line analysis and surface analysis for each element may be performed, and the active material layers 1B and 2B, the solid electrolyte layer 3, and the intermediate layers 1C and 2C may be identified according to change in concentration of these metal elements.

In addition, compositional ratios of Formulae (1) to (3) can be measured, for example, as follows. Using an LA-ICP-MS (laser ablation ICP mass spectrometry) method, contents of Li, V, Al, Ti and P in the compound are quantified. Next, with the remainder being made up of O, the atomic ratio of Li, V, Al, Ti, P and O is calculated. Then, the number of atoms of each of Li, V, Al, Ti, and P when the number of O atoms is 12 is obtained.

(External Terminal)

Preferably, the first external terminal 5 and the second external terminal 6 of the all-solid lithium ion secondary battery 10 use a material having high conductivity. For example, silver, gold, platinum, aluminum, copper, tin, and nickel can be used. The first external terminal 5 and the second external terminal 6 may be made of the same material, or different materials. The external terminal may have a single layer or a plurality of layers.

(Protective Layer)

In addition, the all-solid lithium ion secondary battery 10 may have a protective layer for protecting the laminate 4 and the terminal electrically, physically and chemically on the outer circumference of the laminate 4. As the material constituting the protective layer, a material that has excellent insulating properties, durability, and humidity resistance and is environmentally safe is preferable. For example, glass, ceramics, a thermosetting resin, or a photocurable resin is preferably used. One type of the material of the protective layer may be used alone or a plurality thereof may be used in combination. In addition, the protective layer may be a single layer, but a plurality of protective layers are more preferable. Among them, an organic and inorganic hybrid in which a thermosetting resin and a ceramic powder are mixed is particularly preferable.

(Method of Producing all-Solid Lithium Ion Secondary Battery)

In a method of producing the all-solid lithium ion secondary battery 10, a simultaneous firing method may be used or a sequential firing method may be used.

The simultaneous firing method is a method in which materials forming layers are laminated and a laminate is produced by batch firing. The sequential firing method is a method in which layers are sequentially produced, and a firing process is provided whenever each layer is produced. When the simultaneous firing method is used, it is possible to reduce the number of operating processes of the all-solid lithium ion secondary battery 10. In addition, when the simultaneous firing method is used, the obtained laminate 4 becomes dense. A case using the simultaneous firing method will be exemplified below.

The simultaneous firing method includes a process of preparing a paste of materials forming the laminate 4, a process of applying and drying the paste to produce a green sheet, and a process of laminating the green sheets and simultaneously firing the produced laminate sheets.

First, materials of the positive electrode current collector layer 1A, the positive electrode active material layer 1B, the positive electrode intermediate layer 1C, the solid electrolyte layer 3, the negative electrode intermediate layer 2C, the negative electrode active material layer 2B, and the negative electrode current collector layer 2A constituting the laminate 4 are made into paste forms.

A pasting method is not particularly limited. For example, powders of materials are mixed in a vehicle to obtain pastes. Here, the vehicle is a generic name for media in a liquid phase. Generally, the vehicle includes a solvent, a dispersing agent, and a binder. According to such a method, a paste for the positive electrode current collector layer 1A, a paste for the positive electrode active material layer 1B, a paste for the solid electrolyte layer 3, a paste for the negative electrode active material layer 2B, and a paste for the negative electrode current collector layer 2A are produced.

Next, a green sheet is produced. The green sheet is obtained by applying the produced paste to a base material such as PET (polyethylene terephthalate) in a desired order, drying it as necessary, and then peeling it off from the base material. A paste applying method is not particularly limited. A known method, for example, screen printing, coating, transferring, or a doctor blade, can be used.

The produced green sheets are laminated in a desired order and number of layers. As necessary, alignment, cutting and the like are performed to produce a green sheet laminate. When a parallel type or series type cell is produced, it is preferable to perform alignment and lamination so that an end surface of a positive electrode layer does not match an end surface of a negative electrode layer.

The green sheet laminate may be produced using a positive electrode unit and a negative electrode unit to be described below.

The positive electrode unit is a unit in which the solid electrolyte layer 3/the positive electrode intermediate layer 1C/the positive electrode active material layer 1B/the positive electrode current collector layer 1A/the positive electrode active material layer 1B/the positive electrode intermediate layer 1C are laminated in this order. The positive electrode unit can be produced as follows. First, a solid electrolyte-layer-forming paste is formed as a sheet form on a PET film by a doctor blade method and dried to form the solid electrolyte layer 3. Next, a positive electrode-intermediate-layer-forming paste is printed on the formed solid electrolyte layer 3 by screen printing and dried to form the positive electrode intermediate layer 1C. Next, a paste for the positive electrode active material layer 1B is printed on the formed positive electrode intermediate layer 1C and dried to form the positive electrode active material layer 1B.

Next, a positive electrode current collector-forming paste is printed on the formed positive electrode active material layer 1B by screen printing and dried to form the positive electrode current collector layer 1A. Next, a paste for the positive electrode active material layer 1B is printed again on the formed positive electrode current collector layer 1A by screen printing and dried to form the positive electrode active material layer 1B. In addition, a positive electrode-intermediate-layer-forming paste is printed on the positive electrode active material layer 1B again and dried to form the positive electrode intermediate layer 1C. Then, the PET film is peeled off to produce a positive electrode active material layer unit.

The negative electrode unit is a unit in which the solid electrolyte layer 3/the negative electrode intermediate layer 2C/the negative electrode active material layer 2B/the negative electrode current collector layer 2A/the negative electrode active material layer 2B/the negative electrode intermediate layer 2C are laminated in this order. The negative electrode unit can be produced by forming the solid electrolyte layer 3, the negative electrode intermediate layer 2C, the negative electrode active material layer 2B, the negative electrode current collector layer 2A, the negative electrode active material layer 2B, and the negative electrode intermediate layer 2C in the same procedures as in the positive electrode unit.

The positive electrode unit and the negative electrode unit are laminated to produce a green sheet laminate. In this case, they are laminated so that the solid electrolyte layer 3 of the positive electrode unit is in contact with the negative electrode intermediate layer 2C of the negative electrode unit, or the positive electrode intermediate layer 1C of the positive electrode unit is in contact with the solid electrolyte layer 3 of the negative electrode unit. Thereby, a green sheet laminate in which the positive electrode intermediate layer 1C/the positive electrode active material layer 1B/the positive electrode current collector layer 1A/the positive electrode active material layer 1B/the positive electrode intermediate layer 1C/the solid electrolyte layer 3/the negative electrode intermediate layer 2C/the negative electrode active material layer 2B/the negative electrode current collector layer 2A/the negative electrode active material layer 2B/the negative electrode intermediate layer 2C/the solid electrolyte layer 3 are laminated in this order is obtained. The units are shifted and laminated so that the positive electrode current collector layer 1A of the positive electrode unit extends only on one end surface and the negative electrode current collector layer 2A of the negative electrode unit extends only on the other surface. A sheet for the solid electrolyte layer 3 with a predetermined thickness may be additionally laminated on both surfaces of the produced green sheet laminate.

The produced green sheet laminate is press-bonded at once. Press-bonding is performed while heating. A heating temperature is, for example, 40 to 95° C.

The press-bonded green sheet laminate is heated to 500° C. to 750° C., for example, under a nitrogen, hydrogen and water vapor atmosphere, and the binder is removed. Then, heating and firing are performed at 600° C. to 1,000° C. under a nitrogen, hydrogen and water vapor atmosphere, and thereby a sintered product is obtained. A firing time is, for example, 0.1 to 3 hours. Since the positive electrode active material layer 1B, the positive electrode intermediate layer 1C, the negative electrode active material layer 2B, the negative electrode intermediate layer 2C, and the solid electrolyte layer 3 contain the shared metal elements and have the same composition, contraction due to sintering at substantially the same temperature occurs, and thus the layers become denser and the inside of each layer is firmly bonded.

The sintered laminate may be put into a cylindrical container together with a polishing material such as alumina and subjected to barrel polishing. Thereby, corners of the laminate can be chamfered. As another method, polishing may be performed by sand blasting. This method is preferable because only a specific part can be cut.

(Formation of Terminal)

The first external terminal 5 and the second external terminal 6 are attached to the obtained sintered product. The first external terminal 5 and the second external terminal 6 are formed so that they are electrically in contact with the positive electrode current collector layer 1A and the negative electrode current collector layer 2A. For example, the terminal can be formed using a known method such as a sputtering method, a dipping method, and a spray coating method for the positive electrode current collector layer 1A and the negative electrode current collector layer 2A exposed from a side surface of the sintered product. When forming is performed in only a predetermined part, masking or the like is performed with, for example, a tape, for formation.

While the embodiment of the present invention has been described above in detail with reference to the drawings, configurations and combinations thereof in the present embodiment are only examples, and additions, omissions, substitutions, and other modifications of the configurations can be made without departing from the scope and spirit of the present invention.

For example, while electrode layers on both sides of a pair of electrode layers (the positive electrode layer 1, and the negative electrode layer 2) have the intermediate layers 1C and 2C in the present embodiment, at least one electrode layer between the pair of electrode layers may have an intermediate layer.

In addition, although the electrode active material, the intermediate-layer-forming Li-containing compound, and the solid electrolyte contain three types of metal element such as V, Al, and Ti in the present embodiment, it is acceptable as long as the shared two or more type of metal elements are included. For example, the electrode active material may contain V, Al, and Ti, and the intermediate-layer-forming Li-containing compound and the solid electrolyte may contain Al and Ti (not contain V). In addition, the electrode active material and the intermediate-layer-forming Li-containing compound may contain V, Al, and Ti, and the solid electrolyte may contain Al and Ti. In addition, the electrode active material may contain V and one of Al and Ti, the intermediate-layer-forming Li-containing compound may contain V, Al, and Ti, and the solid electrolyte may contain Al and Ti. In this case, the electrode active material and the intermediate-layer-forming Li-containing compound may share V and one of Al and Ti, and the intermediate-layer-forming Li-containing compound and the solid electrolyte may share Al and Ti.

Here, for an electrode layer having no intermediate layer, a compound having a different composition of a solid electrolyte may be used as an electrode active material. For example, a transition metal oxide, a transition metal composite oxide, or the like can be used. Examples of the transition metal oxide and the transition metal composite oxide include a lithium manganese composite oxide $Li_2Mn_aMa_{1-a}O_3$ ($0.8 \leq a \leq 1$, Ma=Co, Ni), lithium cobaltate ($LiCoO_2$), lithium nickelate ($LiNiO_2$), lithium manganese spinel ($LiMn_2O_4$), a composite metal oxide represented by a general formula: $LiNi_xCo_yMn_zO_2$ ($x+y+z=1$, $0 \leq x \leq 1$, $0 \leq y \leq 1$, $0 \leq z \leq 1$), a lithium vanadium compound ($LiV_2O_5$), an olivine type $LiMbPO_4$ (where, Mb is at least one element selected from among Co, Ni, Mn, Fe, Mg, Nb, Ti, Al, and Zr), lithium vanadium phosphate ($Li_3V_2(PO_4)_3$ or $LiVOPO_4$), a Li-excess solid solution positive electrode represented by $Li_2MnO_3$-$LiMcO_2$ (Mc=Mn, Co, Ni), lithium titanate ($Li_4Ti_5O_{12}$), and a composite metal oxide represented by $Li_sNi_tCo_uAl_vO_2$ ($0.9 < s < 1.3$, $0.9 < t+u+v < 1.1$).

EXAMPLES

Example 1

(Production of Electrode Active Material Powder)

First, as raw material powders, $Li_2CO_3$ powder, $V_2O_5$ powder, $Al_2O_3$ powder, $TiO_2$ powder, and $NH_4H_2PO_4$ powder were prepared. These raw material powders were weighed out so that the atomic number ratio of Li, V, Al, Ti, and P was 2.80:1.80:0.03:0.40:2.80 (=Li:V:Al:Ti:P), and wet-mixed with a ball mill for 16 hours, and then dehydrated and dried to obtain a powder mixture. The obtained powder mixture was fired in air at 800° C. for 2 hours to obtain a calcined product. Then, the obtained calcined product was subjected to wet grinding with a ball mill for 16 hours, and then dehydrated and dried to obtain an electrode active material powder. The composition and the crystal structure of the obtained electrode active material powder were measured. As a result, the composition was $Li_{2.80}V_{1.80}Al_{0.03}Ti_{0.40}P_{2.80}O_{12}$. In addition, the crystal structure was the same crystal structure as lithium vanadium phosphate $[Li_3V_2(PO_4)_3]$ in a monoclinic phase.

(Production of Intermediate-Layer-Forming Li-Containing Compound Powder)

An intermediate-layer-forming Li-containing compound powder was obtained in the same manner as in the production of the electrode active material powder except that raw material powders were weighed out so that the atomic number ratio of Li, V, Al, Ti, and P was 2.60:1.00:0.07:0.90:2.90. The composition and the crystal structure of the obtained intermediate-layer-forming Li-containing compound powder were measured. As a result, the composition was $Li_{2.60}V_{1.00}Al_{0.07}Ti_{0.90}P_{2.90}O_{12}$. In addition, the crystal structure was the same crystal structure as lithium vanadium phosphate $[Li_3V_2(PO_4)_3]$ in a monoclinic phase.

(Production of Solid Electrolyte Powder)

A solid electrolyte powder was obtained in the same manner as in the production of the electrode active material powder except that raw material powders were weighed out so that the atomic number ratio of Li, V, Al, Ti, and P was 1.00:0.05:0.12:1.70:3.00. The composition and the crystal structure of the obtained solid electrolyte powder were measured. As a result, the composition was $Li_{1.00}V_{0.05}Al_{0.12}Ti_{1.70}P_{3.00}O_{12}$. In addition, the crystal structure was the same crystal structure as titanium aluminum lithium phosphate $[Li_{1+x}Al_xTi_{2-x}(PO_4)_3]$.

(Preparation of Electrode Active Material-Layer-Forming Paste)

The electrode active material powder produced as described above was dispersed in a vehicle containing terpineol as a solvent, a nonaqueous dispersing agent as a dispersing agent, and ethylcellulose as a binder to prepare an electrode active material-layer-forming paste.

(Preparation of Intermediate-Layer-Forming Paste)

An intermediate-layer-forming paste was prepared using the intermediate-layer-forming Li-containing compound powder produced as described above in the same manner in the preparation of the electrode active material-layer-forming paste.

(Preparation of Solid Electrolyte-Layer-Forming Paste)

A solid electrolyte-layer-forming paste was prepared using the solid electrolyte powder produced as described above in the same manner as in the preparation of the electrode active material-layer-forming paste.

(Preparation of Current Collector-Layer-Forming Paste)

A current collector-layer-forming paste was prepared using a powder mixture in which copper powder and the electrode active material powder produced as described above were mixed in a ratio of 80/20 in the same manner as in the preparation of the electrode active material-layer-forming paste.

(Production of Positive Electrode Unit)

A positive electrode unit was produced using the electrode active material-layer-forming paste, the intermediate-layer-forming paste, the solid electrolyte-layer-forming paste, and the current collector-layer-forming paste prepared as described above.

First, the solid electrolyte-layer-forming paste was formed in a sheet form on a PET film by a doctor blade method and dried to form the solid electrolyte layer 3. Next, the intermediate-layer-forming paste was printed thereon by screen printing and dried to form the positive electrode intermediate layer 1C. Next, the electrode active material-layer-forming paste was printed thereon by screen printing and dried to form the positive electrode active material layer 1B. Next, the current collector-layer-forming paste was printed thereon by screen printing and dried to form the positive electrode current collector layer 1A. Next, the electrode active material-layer-forming paste was printed thereon by screen printing again and dried to form the positive electrode active material layer 1B. In addition, the positive electrode-intermediate-layer-forming paste was printed thereon by screen printing again and dried to form the positive electrode intermediate layer 1C. Then, the PET film was peeled off to produce a positive electrode unit in which the solid electrolyte layer 3/the positive electrode intermediate layer 1C/the positive electrode active material layer 1B/the positive electrode current collector layer 1A/the positive electrode active material layer 1B/the positive electrode intermediate layer 1C were laminated in this order. 26 positive electrode units were produced.

(Production of Negative Electrode Unit)

A negative electrode unit was produced using the electrode active material-layer-forming paste, the solid electrolyte-layer-forming paste, and the current collector-layer-forming paste prepared as described above.

First, the solid electrolyte-layer-forming paste was formed in a sheet form on a PET film by a doctor blade method and dried to form the solid electrolyte layer 3. Next, the electrode active material-layer-forming paste was printed thereon and dried to form the negative electrode active material layer 2B. Next, the current collector-layer-forming paste was printed thereon by screen printing and dried to form the negative electrode current collector layer 2A. In addition, the electrode active material-layer-forming paste was printed thereon by screen printing again and dried to form the negative electrode active material layer 2B. Then, the PET film was peeled off to produce a negative electrode unit in which the solid electrolyte layer 3/the negative electrode active material layer 2B/the negative electrode current collector layer 2A/the negative electrode active material layer 2B were laminated in this order. 25 negative electrode units were produced.

(Production of all-Solid Lithium Ion Secondary Battery)

The positive electrode units and the negative electrode units produced as described above were alternately laminated to form a green sheet laminate including 26 positive electrode units and 25 negative electrode units, and the binder was removed at 650° C., and simultaneous firing was then performed and thereby a sintered product was obtained. A simultaneous firing temperature was 800° C. and a firing time was 1 hour.

Then, an InGa electrode paste was applied to the positive electrode current collector layer 1A and the negative electrode current collector layer 2A of the obtained sintered product and dried, the first external terminal 5 was attached to the positive electrode current collector layer 1A and the second external terminal 6 was attached to the negative electrode current collector layer 2A, and thereby an all-solid lithium ion secondary battery was produced.

The layer thicknesses of the positive electrode active material layer, the positive electrode intermediate layer, the solid electrolyte layer, and the negative electrode active material layer of the obtained all-solid lithium ion secondary battery were measured. The results thereof and compositions of the layers are shown in Table 1.

(Evaluation of all-Solid Lithium Ion Secondary Battery)

The battery capacity and the internal resistance of the obtained all-solid lithium ion secondary battery were measured by performing charging and discharging at a constant current using a charging and discharging measuring device. Here, a charging and discharging current was 30 μA, and cutoff voltages during charging and discharging were 1.8 V and 0 V. In addition, pause times after charging and after discharging were 1 minute. The internal resistance was obtained by dividing a difference (IR drop) between an open circuit voltage after charging was paused (immediately before discharging started) and a voltage 1 second after discharging started by a current value during discharging. The results are shown in Table 1.

Example 2

(Production of Electrode Active Material Powder)

An electrode active material powder was obtained in the same manner as in Example 1 except that $Li_2CO_3$ powder, $V_2O_5$ powder, and $NH_4H_2PO_4$ powder were weighed out so that the atomic number ratio of Li, V, and P was 2.90:2.00:3.00 (=Li:V:P) in the production of the electrode active material powder in Example 1. The obtained electrode active material powder had a composition of $Li_{2.90}V_{2.00}P_{3.00}O_{12}$ and had the same crystal structure as a lithium vanadium phosphate in a monoclinic phase.

(Production and Evaluation of all-Solid Lithium Ion Secondary Battery)

A negative electrode unit was produced in the same manner as in Example 1 except that the electrode active material powder produced as described above was used. Then, an all-solid lithium ion secondary battery was produced in the same manner as in Example 1 except that the negative electrode unit was used. The layer thicknesses of the positive electrode active material layer, the positive electrode intermediate layer, the solid electrolyte layer, and the negative electrode active material layer, and the battery capacity and the internal resistance were measured. The results are shown in Table 1.

Example 3

(Production of Electrode Active Material Powder)

An electrode active material powder was obtained in the same manner as in Example 1 except that raw material powders were weighed out so that the atomic number ratio of Li, V, Al, Ti, and P was 0.50:2.00:0.05:0.58:2.85 in the production of the electrode active material powder in Example 1. The obtained electrode active material powder had a composition of $Li_{0.50}V_{2.00}Al_{0.05}Ti_{0.58}P_{2.85}O_{12}$ and had the same crystal structure as a lithium vanadium phosphate in a monoclinic phase.

(Production of Intermediate-Layer-Forming Li-Containing Compound Powder)

An intermediate-layer-forming Li-containing compound powder was obtained in the same manner as in Example 1 except that raw material powders were weighed out so that the atomic number ratio of Li, V, Al, Ti, and P was 0.55:1.10:0.07:1.30:2.88 in the production of the electrode active material powder in Example 1. The obtained intermediate-layer-forming Li-containing compound powder had a composition of $Li_{0.55}V_{1.10}Al_{0.07}Ti_{1.30}P_{2.88}O_{12}$ and had the same crystal structure as a lithium vanadium phosphate in a monoclinic phase.

(Production of Solid Electrolyte Powder)

A solid electrolyte powder was obtained in the same manner as in Example 1 except that raw material powders were weighed out so that the atomic number ratio of Li, V, Al, Ti, and P was 0.60:0.05:0.15:1.95:2.90 in the production of the solid electrolyte powder in Example 1. The obtained solid electrolyte powder had a composition of $Li_{0.60}V_{0.05}Al_{0.15}Ti_{1.95}P_{2.90}O_{12}$ and the same crystal structure as a titanium aluminum lithium phosphate.

(Production and Evaluation of all-Solid Lithium Ion Secondary Battery)

A positive electrode unit and a negative electrode unit were produced using the electrode active material powder, the intermediate-layer-forming Li-containing compound powder, and the solid electrolyte powder produced as described above. Then, an all-solid lithium ion secondary battery was produced in the same manner as in Example 1 except that the positive electrode unit and the negative electrode unit were used, and the battery capacity and the internal resistance were measured. The results thereof, the compositions and the layer thicknesses of the positive electrode active material layer, the positive electrode intermediate layer, and the solid electrolyte layer, negative electrode active material layer are shown in Table 1.

Example 4

A positive electrode unit was produced in the same manner as in Example 1 except that an amount of the electrode active material-layer-forming paste applied was adjusted so that the layer thickness of the positive electrode intermediate layer 1C was 0.5 µm in the production of the positive electrode unit in Example 1. Then, an all-solid lithium ion secondary battery was produced in the same manner as in Example 1 except that the positive electrode unit was used. The layer thicknesses of the positive electrode active material layer, the positive electrode intermediate layer, the solid electrolyte layer, and the negative electrode active material layer, and the battery capacity and the internal resistance were measured. The results are shown in Table 1.

Example 5

A positive electrode unit was produced in the same manner as in Example 1 except that an amount of the electrode active material-layer-forming paste applied was adjusted so that the layer thickness of the positive electrode intermediate layer 1C was 5.0 µm in the production of the positive electrode unit in Example 1. Then, an all-solid lithium ion secondary battery was produced in the same manner as in Example 1 except that the positive electrode unit was used. The layer thicknesses of the positive electrode active material layer, the positive electrode intermediate layer, the solid electrolyte layer, and the negative electrode active material layer, and the battery capacity and the internal resistance were measured. The results are shown in Table 1.

Example 6

A positive electrode unit and a negative electrode unit were produced in the same manner as in Example 1 except that no positive electrode intermediate layer 1C was formed in the production of the positive electrode unit in Example 1 and the negative electrode intermediate layer 2C was formed between the solid electrolyte layer 3 and the negative electrode active material layer 2B in the production of the negative electrode unit. Here, the negative electrode intermediate layer 2C was formed by printing the intermediate-layer-forming paste on the solid electrolyte layer 3 and drying it. Then, an all-solid lithium ion secondary battery was produced in the same manner as in Example 1 except that the positive electrode unit and the negative electrode unit were used. The layer thicknesses of the positive electrode active material layer, the positive electrode intermediate layer, the solid electrolyte layer, and the negative electrode active material layer, and the battery capacity and the internal resistance were measured. The results are shown in Table 1.

Comparative Example 1

A positive electrode unit was produced in the same manner as in Example 1 except that no positive electrode intermediate layer 1C was formed in the production of the positive electrode unit in Example 1. Then, an all-solid lithium ion secondary battery was produced in the same manner as in Example 1 except that the positive electrode unit was used. The layer thicknesses of the positive electrode active material layer, the positive electrode intermediate layer, the solid electrolyte layer, and the negative electrode active material layer, and the battery capacity and the internal resistance were measured. The results are shown in Table 1.

Comparative Example 2

(Production of Intermediate-Layer-Forming Li-Containing Compound Powder)

An intermediate-layer-forming Li-containing compound powder was obtained in the same manner as in Example 1 except that $Li_2CO_3$ powder, $TiO_2$ powder, and $NH_4H_2PO_4$ powder were weighed out so that the atomic number ratio of Li, Ti, and P was 2.60:1.40:3.10 (=Li:Ti:P) in the production of the intermediate-layer-forming Li-containing compound powder in Example 1. The obtained intermediate-layer-forming Li-containing compound powder had a composition of $Li_{2.60}Ti_{1.40}P_{3.10}O_{12}$.

(Production and Evaluation of all-Solid Lithium Ion Secondary Battery)

A positive electrode unit was produced in the same manner as in Example 1 except that the intermediate-layerforming Li-containing compound powder produced as described above was used. Then, an all-solid lithium ion secondary battery was produced in the same manner as in Example 1 except that the positive electrode unit was used. The layer thicknesses of the positive electrode active material layer, the positive electrode intermediate layer, the solid electrolyte layer, and the negative electrode active material layer, and the battery capacity and the internal resistance were measured. The results are shown in Table 1.

Comparative Example 3

(Production of Intermediate-Layer-Forming Li-Containing Compound Powder)

An intermediate-layer-forming Li-containing compound powder was obtained in the same manner as in Example 1 except that $Li_2CO_3$ powder, $V_2O_5$ powder, and $NH_4H_2PO_4$ powder were weighed out so that the atomic number ratio of Li, V, and P was 2.90:1.20:3.15 (=Li:V:P) in the production of the intermediate-layer-forming Li-containing compound powder in Example 1. The obtained intermediate-layer-forming Li-containing compound powder had a composition of $Li_{2.60}Ti_{1.40}P_{3.10}O_{12}$.

(Production and Evaluation of all-Solid Lithium Ion Secondary Battery)

A positive electrode unit was produced in the same manner as in Example 1 except that the intermediate-layer-forming Li-containing compound powder produced as described above was used. Then, an all-solid lithium ion secondary battery was produced in the same manner as in Example 1 except that the positive electrode unit was used. The layer thicknesses of the positive electrode active material layer, the positive electrode intermediate layer, the solid electrolyte layer, and the negative electrode active material layer, and the battery capacity and the internal resistance were measured. The results are shown in Table 1.

TABLE 1

|  |  | Composition | | | | | | Layer thickness | Battery capacity | Internal resistance |
|---|---|---|---|---|---|---|---|---|---|---|
|  |  | Li | V | Al | Ti | P | O | (µm) | (µAh) | (kΩ) |
| Example 1 | Positive electrode active material layer | 2.80 | 1.80 | 0.03 | 0.40 | 2.80 | 12 | 2.03 | 103.2 | 1.15 |
|  | Positive electrode intermediate layer | 2.60 | 1.00 | 0.07 | 0.90 | 2.90 | 12 | 2.01 |  |  |
|  | Solid electrolyte layer | 1.00 | 0.05 | 0.12 | 1.70 | 3.00 | 12 | 9.07 |  |  |
|  | Negative electrode active material layer | 2.80 | 1.80 | 0.03 | 0.40 | 2.80 | 12 | 2.04 |  |  |
| Example 2 | Positive electrode active material layer | 2.80 | 1.80 | 0.03 | 0.40 | 2.80 | 12 | 2.02 | 72.4 | 2.63 |
|  | Positive electrode intermediate layer | 2.60 | 1.00 | 0.07 | 0.90 | 2.90 | 12 | 2.03 |  |  |
|  | Solid electrolyte layer | 1.00 | 0.05 | 0.12 | 1.70 | 3.00 | 12 | 9.00 |  |  |
|  | Negative electrode active material layer | 2.90 | 2.00 | 0.00 | 0.00 | 3.00 | 12 | 2.08 |  |  |
| Example 3 | Positive electrode active material layer | 0.50 | 2.00 | 0.05 | 0.58 | 2.85 | 12 | 2.04 | 77.2 | 1.42 |
|  | Positive electrode intermediate layer | 0.55 | 1.10 | 0.07 | 1.30 | 2.88 | 12 | 2.01 |  |  |
|  | Solid electrolyte layer | 0.60 | 0.05 | 0.15 | 1.95 | 2.90 | 12 | 9.03 |  |  |
|  | Negative electrode active material layer | 0.50 | 2.00 | 0.05 | 0.58 | 2.85 | 12 | 2.01 |  |  |
| Example 4 | Positive electrode active material layer | 2.80 | 1.80 | 0.03 | 0.40 | 2.80 | 12 | 2.00 | 105.4 | 1.12 |
|  | Positive electrode intermediate layer | 2.60 | 1.00 | 0.07 | 0.90 | 2.90 | 12 | 0.51 |  |  |
|  | Solid electrolyte layer | 1.00 | 0.05 | 0.12 | 1.70 | 3.00 | 12 | 9.00 |  |  |
|  | Negative electrode active material layer | 2.80 | 1.80 | 0.03 | 0.40 | 2.80 | 12 | 2.00 |  |  |
| Example 5 | Positive electrode active material layer | 2.80 | 1.80 | 0.03 | 0.40 | 2.80 | 12 | 2.00 | 99.1 | 1.21 |
|  | Positive electrode intermediate layer | 2.60 | 1.00 | 0.07 | 0.90 | 2.90 | 12 | 5.00 |  |  |
|  | Solid electrolyte layer | 1.00 | 0.05 | 0.12 | 1.70 | 3.00 | 12 | 9.04 |  |  |
|  | Negative electrode active material layer | 2.80 | 1.80 | 0.03 | 0.40 | 2.80 | 12 | 2.08 |  |  |
| Example 6 | Positive electrode active material layer | 2.80 | 1.80 | 0.03 | 0.40 | 2.80 | 12 | 2.02 | 101.4 | 1.22 |
|  | Solid electrolyte layer | 1.00 | 0.05 | 0.12 | 1.70 | 3.00 | 12 | 9.04 |  |  |
|  | Negative electrode intermediate layer | 2.60 | 1.00 | 0.07 | 0.90 | 2.90 | 12 | 2.05 |  |  |
|  | Negative electrode active material layer | 2.80 | 1.80 | 0.03 | 0.40 | 2.80 | 12 | 2.06 |  |  |
| Comparative Example 1 | Positive electrode active material layer | 2.80 | 1.80 | 0.03 | 0.40 | 2.80 | 12 | 2.01 | 6.8 | 17.22 |
|  | Solid electrolyte layer | 1.00 | 0.05 | 0.12 | 1.70 | 3.00 | 12 | 9.09 |  |  |
|  | Negative electrode active material layer | 2.80 | 1.80 | 0.03 | 0.40 | 2.80 | 12 | 2.01 |  |  |

TABLE 1-continued

| | | Composition | | | | | | Layer thickness (μm) | Battery capacity (μAh) | Internal resistance (kΩ) |
|---|---|---|---|---|---|---|---|---|---|---|
| | | Li | V | Al | Ti | P | O | | | |
| Comparative Example 2 | Positive electrode active material layer | 2.80 | 1.80 | 0.03 | 0.40 | 2.80 | 12 | 2.04 | 12.2 | 14.33 |
| | Positive electrode intermediate layer | 4.00 | 0.00 | 0.00 | 5.00 | 0.00 | 12 | 2.03 | | |
| | Solid electrolyte layer | 1.00 | 0.05 | 0.12 | 1.70 | 3.20 | 12 | 9.01 | | |
| | Negative electrode active material layer | 2.80 | 1.80 | 0.03 | 0.40 | 2.80 | 12 | 2.01 | | |
| Comparative Example 3 | Positive electrode active material layer | 3.00 | 1.80 | 0.03 | 0.40 | 2.80 | 12 | 2.01 | 14.1 | 12.91 |
| | Positive electrode intermediate layer | 1.96 | 5.46 | 0.00 | 0.00 | 0.00 | 12 | 2.03 | | |
| | Solid electrolyte layer | 1.00 | 0.05 | 0.12 | 1.70 | 3.20 | 12 | 9.01 | | |
| | Negative electrode active material layer | 3.00 | 1.80 | 0.03 | 0.40 | 2.80 | 12 | 2.03 | | |

The all-solid lithium ion secondary batteries obtained in Comparative Examples 1 to 3 had a high internal resistance and a low battery capacity. In Comparative Example 1, it was assumed that both the positive electrode layer and the negative electrode layer had no intermediate layer. Comparative Example 2 and Comparative Example 3 had the positive electrode intermediate layer 1C. However, a metal element other than Li which was the same in the positive electrode active material layer 1B, the positive electrode intermediate layer 1C, and the solid electrolyte layer 3 was only Ti in Comparative Example 2 and only V in Comparative Example 3. Therefore, it was assumed that it was not possible to sufficiently reduce the internal resistance.

On the other hand, the all-solid lithium ion secondary batteries obtained in Examples 1 to 5, in which the positive electrode intermediate layer was provided on the surface of the positive electrode active material layer on the side of the solid electrolyte layer, and each of the solid electrolyte layer, the positive electrode intermediate layer, and the positive electrode active material layer includes a compound containing Li and two or more types of metal elements other than Li, the two or more types of metal elements in the solid electrolyte layer, the positive electrode intermediate layer, and the positive electrode active material layer are identical between the solid electrolyte layer, the positive electrode intermediate layer, and the positive electrode active material layer, had a low internal resistance and a high battery capacity.

INDUSTRIAL APPLICABILITY

When the internal resistance of the all-solid lithium ion cell is further reduced, it is possible to further increase an output current of the all-solid lithium ion cell.

REFERENCE SIGNS LIST

1 Positive electrode layer
1A Positive electrode current collector layer
1B Positive electrode active material layer
1C Positive electrode intermediate layer
2 Negative electrode layer
2A Negative electrode current collector layer
2B Negative electrode active material layer
2C Negative electrode intermediate layer
3 Solid electrolyte layer
4 Laminate
5 First external terminal
6 Second external terminal
10 All-solid lithium ion secondary battery

The invention claimed is:

1. An all-solid lithium ion secondary battery comprising a pair of electrode layers and a solid electrolyte layer provided between the pair of electrode layers,
   wherein at least one electrode of the pair of electrodes has an active material layer and an intermediate layer provided on the surface of the active material layer on the side of the solid electrolyte layer, and
   wherein each of the solid electrolyte layer, the intermediate layer, and the active material layer contains a Li-containing compound which contains Li and two or more shared types of metal elements other than Li, the two or more shared types of metal elements in the solid electrolyte layer, the intermediate layer, and the active material layer being identical between the solid electrolyte layer, the intermediate layer, and the active material layer, and
   wherein the pair of electrode layers and a solid electrolyte layer provided between the pair of electrode layers have a relative density of 80% or more.

2. The all-solid lithium ion secondary battery according to claim 1,
   wherein the Li-containing compound in the solid electrolyte layer, the Li-containing compound in the intermediate layer, and the Li-containing compound in the active material layer include a shared type of polyanion, the shared type of polyanion in the solid electrolyte layer, the intermediate layer, and the active material layer being identical between the solid electrolyte layer, the intermediate layer, and the active material layer.

3. The all-solid lithium ion secondary battery according to claim 1,
   wherein the shared type of polyanion is a polyphosphate.

4. The all-solid lithium ion secondary battery according to claim 1,
   wherein the two or more shared types of metal elements contained in the Li-containing compound in the solid electrolyte layer, the Li-containing compound in the intermediate layer, and the Li-containing compound in the active material layer are V, Ti, and Al.

5. The all-solid lithium ion secondary battery according to claim 1,
   wherein a content of V is reduced in the order of the Li-containing compound in the solid electrolyte layer, the Li-containing compound in the intermediate layer, and the Li-containing compound in the active material layer.

6. The all-solid lithium ion secondary battery according to claim 1,
wherein contents of Ti and Al are increased in the order of the Li-containing compound in the solid electrolyte layer, the Li-containing compound in the intermediate layer, and the Li-containing compound in the active material layer.

7. The all-solid lithium ion secondary battery according to claim 1,
wherein a thickness of the intermediate layer is in a range of 0.5 μm or more and 5.0 μm or less.

8. The all-solid lithium ion secondary battery according to claim 1,
wherein electrode layers on both sides of the pair of electrode layers include an active material layer and an active material layer including an intermediate layer provided on the surface of the active material layer on the side of the solid electrolyte layer.

9. An all-solid lithium ion secondary battery comprising a pair of electrode layers and a solid electrolyte layer provided between the pair of electrode layers,
wherein at least one electrode of the pair of electrodes has an active material layer and an intermediate layer provided on the surface of the active material layer on the side of the solid electrolyte layer, and
wherein each of the solid electrolyte layer, the intermediate layer, and the active material layer contains a Li-containing compound which contains Li and two or more shared types of metal elements other than Li, the two or more shared types of metal elements in the solid electrolyte layer, the intermediate layer, and the active material layer being identical between the solid electrolyte layer, the intermediate layer, and the active material layer, and
wherein the Li-containing compound in the solid electrolyte layer, the Li-containing compound in the intermediate layer, and the Li-containing compound in the active material layer include a shared type of polyanion, the shared type of polyanion in the solid electrolyte layer, the intermediate layer, and the active material layer being identical between the solid electrolyte layer, the intermediate layer, and the active material layer.

10. The all-solid lithium ion secondary battery according to claim 9,
wherein the shared type of polyanion is a polyphosphate.

11. The all-solid lithium ion secondary battery according to claim 9,
wherein the two or more shared types of metal elements contained in the Li-containing compound in the solid electrolyte layer, the Li-containing compound in the intermediate layer, and the Li-containing compound in the active material layer are V, Ti, and Al.

12. The all-solid lithium ion secondary battery according to claim 9,
wherein a content of V is reduced in the order of the Li-containing compound in the solid electrolyte layer, the Li-containing compound in the intermediate layer, and the Li-containing compound in the active material layer.

13. The all-solid lithium ion secondary battery according to claim 9,
wherein contents of Ti and Al are increased in the order of the Li-containing compound in the solid electrolyte layer, the Li-containing compound in the intermediate layer, and the Li-containing compound in the active material layer.

14. The all-solid lithium ion secondary battery according to claim 9,
wherein a thickness of the intermediate layer is in a range of 0.5 μm or more and 5.0 μm or less.

15. The all-solid lithium ion secondary battery according to claim 9,
wherein electrode layers on both sides of the pair of electrode layers include an active material layer and an active material layer including an intermediate layer provided on the surface of the active material layer on the side of the solid electrolyte layer.

16. The all-solid lithium ion secondary battery according to claim 9,
wherein a pair of electrode layers and a solid electrolyte layer provided between the pair of electrode layers have a relative density of 80% or more.

17. An all-solid lithium ion secondary battery comprising a pair of electrode layers and a solid electrolyte layer provided between the pair of electrode layers,
wherein at least one electrode of the pair of electrodes has an active material layer and an intermediate layer provided on the surface of the active material layer on the side of the solid electrolyte layer, and
wherein each of the solid electrolyte layer, the intermediate layer, and the active material layer contains a Li-containing compound which contains Li and two or more shared types of metal elements other than Li including at least Ti and Al, the two or more shared types of metal elements in the solid electrolyte layer, the intermediate layer, and the active material layer being identical between the solid electrolyte layer, the intermediate layer, and the active material layer, and
wherein contents of Ti and Al are increased in the order of the Li-containing compound in the solid electrolyte layer, the Li-containing compound in the intermediate layer, and the Li-containing compound in the active material layer.

18. The all-solid lithium ion secondary battery according to claim 17,
wherein the Li-containing compound in the solid electrolyte layer, the Li-containing compound in the intermediate layer, and the Li-containing compound in the active material layer include a shared type of polyanion, the shared type of polyanion in the solid electrolyte layer, the intermediate layer, and the active material layer being identical between the solid electrolyte layer, the intermediate layer, and the active material layer.

19. The all-solid lithium ion secondary battery according to claim 17,
wherein the shared type of polyanion is a polyphosphate.

20. The all-solid lithium ion secondary battery according to claim 17,
wherein the two or more shared types of metal elements contained in the Li-containing compound in the solid electrolyte layer, the Li-containing compound in the intermediate layer, and the Li-containing compound in the active material layer are V, Ti, and Al.

21. The all-solid lithium ion secondary battery according to claim 17,
wherein a content of V is reduced in the order of the Li-containing compound in the solid electrolyte layer, the Li-containing compound in the intermediate layer, and the Li-containing compound in the active material layer.

22. The all-solid lithium ion secondary battery according to claim 17,
wherein a thickness of the intermediate layer is in a range of 0.5 μm or more and 5.0 μm or less.

23. The all-solid lithium ion secondary battery according to claim 17,
wherein electrode layers on both sides of the pair of electrode layers include an active material layer and an active material layer including an intermediate layer provided on the surface of the active material layer on the side of the solid electrolyte layer.

24. The all-solid lithium ion secondary battery according to claim 17,
wherein a pair of electrode layers and a solid electrolyte layer provided between the pair of electrode layers have a relative density of 80% or more.

* * * * *